(12) United States Patent
Moy

(10) Patent No.: US 12,179,393 B1
(45) Date of Patent: Dec. 31, 2024

(54) CLAY PIGEON SHOOTING SYSTEM AND METHOD

(71) Applicant: Gerard E. Moy, Red Oak, TX (US)

(72) Inventor: Gerard E. Moy, Red Oak, TX (US)

(*) Notice: Subject to any disclaimer, the term of this patent is extended or adjusted under 35 U.S.C. 154(b) by 0 days.

(21) Appl. No.: 18/371,008

(22) Filed: Sep. 21, 2023

Related U.S. Application Data

(63) Continuation-in-part of application No. 16/357,924, filed on Mar. 19, 2019, now Pat. No. 11,555,666.

(60) Provisional application No. 62/761,365, filed on Mar. 21, 2018.

(51) Int. Cl.
| | |
|---|---|
| *B29C 43/02* | (2006.01) |
| *B29C 43/58* | (2006.01) |
| *B29K 55/02* | (2006.01) |
| *B29K 75/00* | (2006.01) |
| *B29K 83/00* | (2006.01) |
| *B29L 31/00* | (2006.01) |
| *F41C 23/08* | (2006.01) |

(52) U.S. Cl.
CPC ............ *B29C 43/021* (2013.01); *F41C 23/08* (2013.01); *B29C 43/58* (2013.01); *B29C 2043/5825* (2013.01); *B29K 2055/02* (2013.01); *B29K 2075/00* (2013.01); *B29K 2083/00* (2013.01); *B29K 2995/0039* (2013.01); *B29K 2995/007* (2013.01); *B29L 2031/777* (2013.01)

(58) Field of Classification Search
CPC .................. B29C 43/021; B29C 43/53; B29C 2043/5825; F41C 23/08; B29K 2055/02; B29K 2075/00; B29K 2083/00; B29K 2995/0039; B29K 2995/007; B29L 2031/777

See application file for complete search history.

(56) References Cited

U.S. PATENT DOCUMENTS

| | | | | |
|---|---|---|---|---|
| 412,479 | A * | 10/1889 | Davis ..................... | A63B 49/08 264/293 |
| 544,269 | A * | 8/1895 | Winters .................. | F41C 23/08 42/74 |
| 1,538,990 | A * | 5/1925 | Hawkins ................ | F41C 23/08 42/74 |
| 1,805,273 | A * | 5/1931 | Ammann ................ | F41C 23/08 42/74 |
| 2,205,769 | A * | 6/1940 | Sweetland ............. | A01K 87/08 81/492 |
| 2,344,752 | A * | 3/1944 | Utz ........................ | F41C 23/08 42/74 |
| 3,491,473 | A * | 1/1970 | Eastin .................... | F41C 23/06 42/74 |

(Continued)

*Primary Examiner* — Michelle Clement

(57) ABSTRACT

Embodiments of the present disclosure provide a recoil pad making method and a method of using the same. According to certain embodiments, a recoil pad making method includes the steps of providing a base member attached to a first portion of a cushion member, shaping an amorphous hardening material on a first surface of the first portion to form a second portion of the cushion member, and shaping, prior to hardening of the amorphous hardening material, the amorphous hardening material around a portion of a shoulder of a user to create a second surface of the second portion that has a shoulder facing contour that matches a contour of the portion of the shoulder. The base member configured to be mounted to a buttstock of a gun. The first portion of the cushion member is pre-cured on the base member.

20 Claims, 15 Drawing Sheets

(56) References Cited

U.S. PATENT DOCUMENTS

| | | | | |
|---|---|---|---|---|
| 3,696,544 | A * | 10/1972 | Webb | F41C 23/08 42/74 |
| 4,316,342 | A * | 2/1982 | Griggs | F41C 23/06 42/74 |
| 4,385,024 | A * | 5/1983 | Tansill | A61F 13/04 264/261 |
| 4,504,604 | A * | 3/1985 | Pilkington | C08L 65/00 42/74 |
| 4,599,920 | A * | 7/1986 | Schmid | B25G 1/102 81/177.1 |
| 4,683,671 | A * | 8/1987 | Farrar | F41C 23/08 42/74 |
| 4,934,024 | A * | 6/1990 | Sexton, I | B25G 1/102 264/222 |
| 4,956,932 | A * | 9/1990 | Cupp | F41C 23/08 42/74 |
| 4,998,367 | A * | 3/1991 | Leibowitz | F41C 23/06 42/74 |
| 5,155,878 | A * | 10/1992 | Dellis | B62K 21/26 264/222 |
| 5,265,366 | A * | 11/1993 | Thompson | F41C 23/08 42/74 |
| 5,375,360 | A * | 12/1994 | Vatterott | F41C 23/08 42/74 |
| 5,471,776 | A * | 12/1995 | Chesnut | F41C 23/08 42/74 |
| 5,555,584 | A * | 9/1996 | Moore, III | A43B 7/28 36/43 |
| 5,669,168 | A * | 9/1997 | Perry | F41C 23/08 42/74 |
| 6,301,817 | B1 * | 10/2001 | Hogue | F41C 23/18 42/71.01 |
| 6,305,115 | B1 * | 10/2001 | Cook | F41C 23/08 42/74 |
| 6,311,423 | B1 * | 11/2001 | Graham | F41C 23/20 42/74 |
| 6,328,494 | B1 * | 12/2001 | Moxon | B43K 8/003 206/374 |
| 6,467,212 | B1 * | 10/2002 | Apel | F41C 23/08 42/74 |
| 6,594,935 | B2 * | 7/2003 | Beretta | F41C 23/08 42/74 |
| 6,832,413 | B1 * | 12/2004 | Applewhite | B25G 1/102 16/DIG. 18 |
| 6,834,456 | B2 * | 12/2004 | Murello | F41C 23/08 42/74 |
| 7,335,325 | B1 * | 2/2008 | Pierson | A63B 53/14 264/223 |
| 8,192,813 | B2 * | 6/2012 | Runyan | H01B 3/441 524/848 |
| 8,506,418 | B2 * | 8/2013 | Tremulis | A63B 60/10 473/300 |
| 10,697,730 | B2 * | 6/2020 | Brown | F41C 23/16 |
| 2001/0011434 | A1 * | 8/2001 | Gussalli Beretta | F41C 23/08 42/74 |
| 2002/0088161 | A1 * | 7/2002 | Sims | F41C 23/08 42/74 |
| 2002/0170224 | A1 * | 11/2002 | Lawless | F41C 23/10 42/71.02 |
| 2003/0226304 | A1 * | 12/2003 | Murello | F41C 23/08 42/74 |
| 2006/0157901 | A1 * | 7/2006 | Vito | A61F 13/069 267/136 |
| 2006/0168869 | A1 * | 8/2006 | Daul | F41C 23/08 42/74 |
| 2009/0178323 | A1 * | 7/2009 | Fluhr | F41C 23/20 42/71.01 |
| 2010/0242333 | A1 * | 9/2010 | Kincel | F41C 23/14 42/73 |
| 2011/0107642 | A1 * | 5/2011 | Godard | F41C 23/16 156/60 |
| 2011/0113666 | A1 * | 5/2011 | Latimer | F41C 23/08 42/74 |
| 2011/0173863 | A1 * | 7/2011 | Ingram | F41C 23/14 42/74 |
| 2012/0144715 | A1 * | 6/2012 | Simpson | F41C 23/18 42/74 |
| 2012/0167430 | A1 * | 7/2012 | Freed | F41C 23/10 42/71.02 |
| 2012/0167432 | A1 * | 7/2012 | Howe | B29C 33/306 42/74 |
| 2013/0174461 | A1 * | 7/2013 | Ballard | F41C 23/08 42/74 |
| 2014/0165443 | A1 * | 6/2014 | Johnston | F41C 23/10 42/74 |
| 2014/0173812 | A1 * | 6/2014 | Krueger | A41D 13/0155 2/455 |
| 2014/0190055 | A1 * | 7/2014 | Warburton | F41C 23/20 42/71.01 |
| 2014/0196336 | A1 * | 7/2014 | Butler | F41C 23/08 42/1.06 |
| 2014/0259849 | A1 * | 9/2014 | Jakele | F41C 23/20 42/74 |
| 2016/0010944 | A1 * | 1/2016 | Downey | F41C 23/14 42/74 |
| 2016/0273874 | A1 * | 9/2016 | Butler | F41C 23/08 |
| 2017/0122698 | A1 * | 5/2017 | Chu | F41B 11/70 |
| 2018/0017354 | A1 * | 1/2018 | Betteridge | F41C 23/08 |
| 2018/0321012 | A1 * | 11/2018 | Bentley | F41C 23/18 |
| 2018/0335272 | A1 * | 11/2018 | Heinz | F41C 23/20 |
| 2018/0335273 | A1 * | 11/2018 | Doty | F41C 23/14 |
| 2019/0316873 | A1 * | 10/2019 | Kronengold | F41C 23/14 |
| 2020/0282655 | A1 * | 9/2020 | Plant | A43B 1/0009 |
| 2020/0340778 | A1 * | 10/2020 | Bryan | F41C 23/08 |

\* cited by examiner

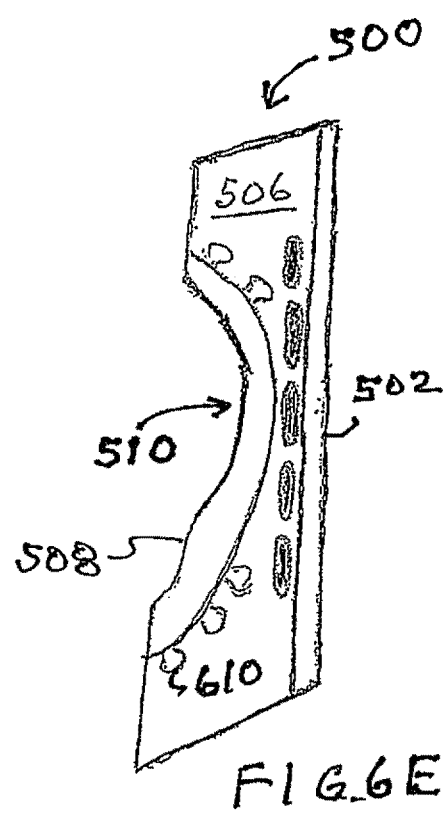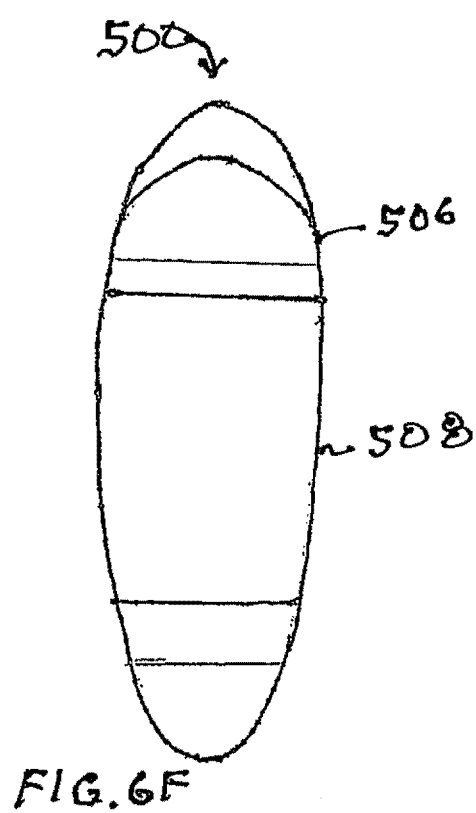
FIG. 6E
FIG. 6F

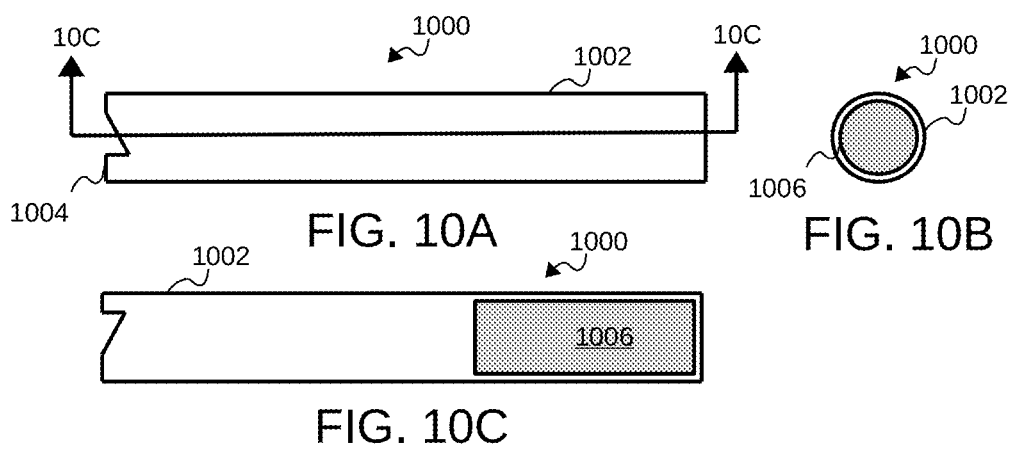

CLAY PIGEON SHOOTING SYSTEM AND METHOD

CROSS REFERENCE TO RELATED APPLICATIONS

This application is a continuation of and claims priority to patent application Ser. No. 17/108,084, filed Dec. 1, 2020 entitled "Clay Pigeon Shooting System and Method," which in turn, claims priority under 35 U.S.C. § 119 to U.S. Patent Application Ser. No. 62/942,855, filed Dec. 3, 2019 entitled "Clay Pigeon Shooting System and Method." This application is also a continuation-in-part of and claims priority to patent application Ser. No. 16/357,924, filed Mar. 19, 2019 entitled "Clay Pigeon Shooting System and Method," which in turn, claims priority under 35 U.S.C. § 119 to U.S. Patent Application Ser. No. 62/761,365, filed Mar. 21, 2018 entitled "Clay Pigeon Shooting System and Method." patent application Ser. No. 17/108,084 and Patent Application Ser. No. 62/942,855 are hereby incorporated by reference in their entirety.

TECHNICAL FIELD

Aspects of the present disclosure relate to clay pigeons and, in particular, to a clay pigeon shooting system and method.

BACKGROUND

Clay pigeon shooting, also known as clay target shooting, and formally known as Inanimate Bird Shooting, is the art of shooting a firearm at a type of flying targets commonly known as clay pigeons (e.g., clay targets). In this competitive genre of sport, clay pigeon shooters shoot at the clay pigeons that have been thrown from mechanisms commonly referred to as traps. Clay pigeon shooting may have over twenty different forms of regulated competition called disciplines, although most can be grouped under the main headings of trap, skeet, and sporting clays.

SUMMARY

Embodiments of the present disclosure provide a recoil pad making method and a method of using the same. According to certain embodiments, a recoil pad making method includes the steps of providing a base member attached to a first portion of a cushion member, shaping an amorphous hardening material on a first surface of the first portion to form a second portion of the cushion member, and shaping, prior to hardening of the amorphous hardening material, the amorphous hardening material around a portion of a shoulder of a user to create a second surface of the second portion that has a shoulder facing contour that matches a contour of the portion of the shoulder. The base member configured to be mounted to a buttstock of a gun. The first portion of the cushion member is pre-cured on the base member.

According to another embodiment, a recoil pad making method includes the steps of creating a base member that is configured to be mounted to a buttstock of a gun, attaching a first portion of a cushion member to the base member, shaping an amorphous hardening material on a first surface of the first portion to form a second portion of the cushion member, and shaping, prior to hardening of the amorphous hardening material, the amorphous hardening material around a portion of a shoulder of a user to create a second surface of the second portion that has a shoulder facing contour that matches a contour of the portion of the shoulder.

According to yet another embodiment, a recoil pad making method includes the steps of creating a base member that is configured to be mounted to a buttstock of a gun, attaching a first portion of a cushion member to the base member, and providing an amorphous hardening material configured to be shaped on a first surface of the first portion to form a second portion of the cushion member. Prior to hardening of the amorphous hardening material, the amorphous hardening material is configured to be shaped around a portion of a shoulder of a user to create a second surface of the second portion that has a shoulder facing contour that matches a contour of the portion of the shoulder.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not drawn to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

FIGS. 6A through 6F illustrate an example process that may be used to make the custom recoil pad as shown in FIG. 5.

FIGS. 10A through 10C illustrate an example elastomeric drill bit according to one embodiment of the present disclosure.

DETAILED DESCRIPTION

Figure 1A:
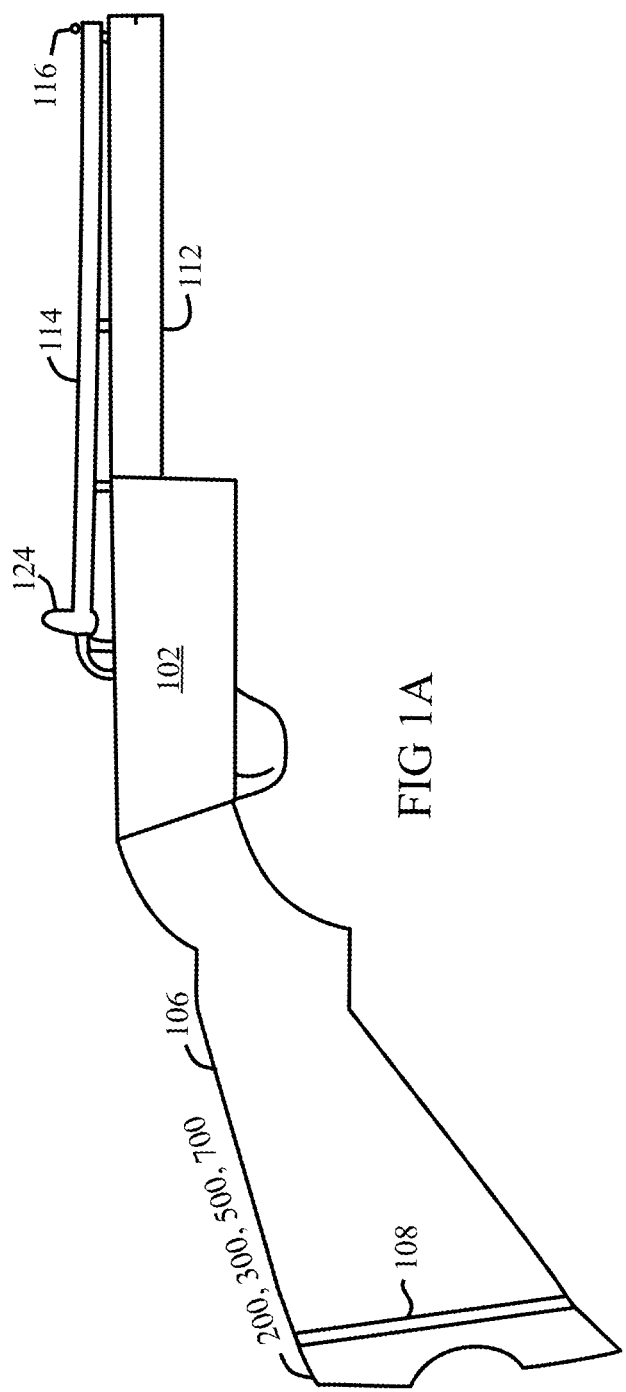
FIG. 1A illustrates an example clay pigeon shooting system according to certain embodiments of the present disclosure.

FIG. 1A illustrates an example clay pigeon shooting system 100 according to certain embodiments of the present disclosure. The clay pigeon shooting system 100 includes a shotgun 102 that may be used to fire shotgun loads at a target, which may be any suitable type, such as a clay pigeon used on a skeet range, trap range, or a sporting clay range.

The shotgun 102 has a buttstock 106 with a back end 108, a barrel 112, a rib 114, and a front sight 116. According to embodiments of the present disclosure, the shotgun 102 may be configured with a custom recoil pad 200, 300, 500, 700 that may be used to, among other things, enhance the accuracy, comfort, and/or shooting enjoyment of a clay pigeon shooter.

Figure 1B:
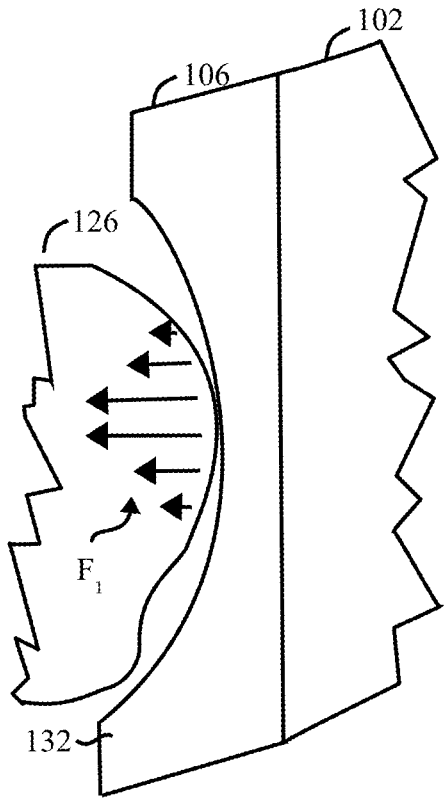
FIGS. 1B and 1C illustrate differences in how several example recoil pads may function when the shotgun of FIG. 1A is fired according to certain embodiments of the present disclosure.
Figure 1C:
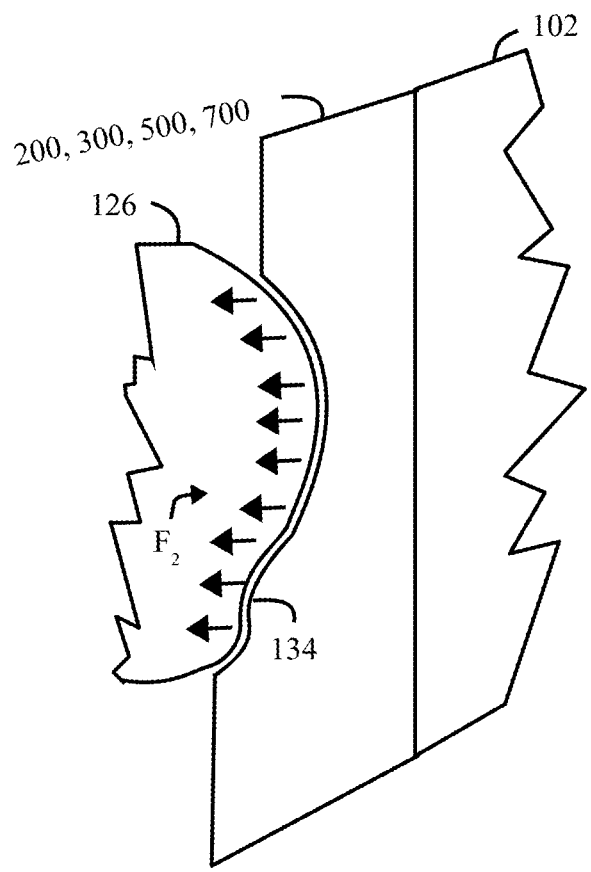

FIGS. 1B and 1C illustrate differences in how several example recoil pads may function when the shotgun 102 is fired according to certain embodiments of the present disclosure. In particular, FIG. 1B illustrates how a conventional recoil pad 130 may function when the shotgun 102 is fired, while FIG. 1C illustrates how the custom recoil pad 200, 300, 500, 700 may function when the shotgun 102 is fired. In particular, FIG. 1B shows a distribution of forces F1 that may be imparted upon a shoulder 126 of a clay pigeon shooter (e.g., user) when the shotgun 102 is fired using the conventional recoil pad 130, while FIG. 1C shows a distribution of forces F2 that may be imparted upon the shoulder 126 of the user when the shotgun 102 is fired using the custom recoil pad 200, 300, 500, 700. As shown, the custom recoil pad 200, 300, 500, 700 distributes the recoil force more evenly than that of the conventional recoil pad 130.

Many conventional recoil pads have been designed to optimize a recoil dampening (e.g., cushioning) effect that may be experienced by the clay pigeon shooter. For example, many users who compete in the clay shooting sports (e.g., skeet, trap, sporting clays, etc.) will often shoot their shotgun numerous times (e.g., over 100 times) during a single sporting event. This amount of shooting can, and often does, cause substantial stress upon the shoulder 126 of the user. As such, significant development efforts have been made to minimize recoil effects felt by the user.

Conventional techniques for recoil dampening have often involved optimizing an elasticity of the recoil pad to reduce or dampen the detrimental effects of recoil felt by the user. But even though substantial development efforts have been made, conventional recoil pads suffer in that their contour does not match that of the shoulder of a user. As shown in FIG. 1B, even though the example conventional recoil pad 130 may possess a shoulder facing contour 132 having a generic curvature, it does not follow the contour of the user's shoulder 126. Thus, the generic conventional recoil pad 130 often generates a relatively high impact force F1 at a relatively small region of the shoulder 126, thus yielding a relatively high level of impact force at this localized region.

Conversely as shown in FIG. 1C, the example custom recoil pad 200, 300, 500, 700 constructed according to certain embodiments of the present disclosure has a shoulder facing contour 134 that is fitted (e.g., shaped) to follow the contour of the shoulder 126 to a relatively good degree such that the recoil impact force F2 is distributed across the shoulder 126 of the user. Thus, the relatively high, localized impact force F1 that would otherwise be imparted onto a small region of the user's shoulder 126 using the conventional recoil pad 130 is reduced. Moreover, because the relatively high localized impact force F1 is reduced, physical soreness and/or shoulder strain often attributed to numerous impact force events caused by repeated firings of the shotgun may also be reduced. Whereas even though conventional recoil pads may, or may not possess a curved contour, this contour was merely semi-circular or semi-oval in shape and not customized to the shape of the shoulder of the human body, which is neither semi-circular nor semi-oval in shape. Embodiments of the present disclosure provide a recoil pad 200, 300, 500, 700 having a contour specifically adapted around the contour of the shoulder of the user. Such a recoil pad may provide one or more advantages, which may include for example, enhanced distribution of recoil force across the shoulder area, consistent positioning of the buttstock 106 on the shoulder of the clay pigeon shooter, and the like.

Every user's shoulder contour (e.g., curvature) may be unique to that individual for various reasons. For example, differences in the overall size and mass of the user's skeletal structure may cause the shoulder's contour of that user to be different from other users. As another example, differences in lifestyle habits, such as exercise habits and/or dietary habits, may cause the shoulder's contour of that user to be different from other users. Thus fabricating a recoil pad with a generic contour that adequately conforms to the unique contour of each user's shoulder has been a relatively difficult endeavor. This problem is exacerbated due to the relatively high, localized impact forces imparted onto certain portions of the muscular structure of the shoulder, such as the deltoideous muscle that is also used to aid in controlling the positioning and firing of the shotgun 102. Thus, as muscle fatigue of such muscles increases due to repeated high, localized impact forces caused by recoil, positioning and firing consistency of the user diminishes. Embodiments of the present disclosure may provide a solution to these problems, among other problems, using a custom recoil pad 200, 300, 500, 700 with a shoulder facing contour 134 that is customized to match that of the user's shoulder contour so that the relatively high, localized impact forces commonly associated with recoil may be more evenly distributed over the shoulder for effectively reducing the recoil felt by the user.

Within this disclosure, the phrase "unique contour of a user's shoulder" shall be construed to mean a contour having a curvature that includes contour features uniquely associated with that particular user. For example, one user may have an occupation (e.g., plumber, electrician, automobile mechanic, etc.) that causes above average stress on certain shoulder muscles such that the shape of the shoulder of that individual will be different than other relatively similarly sized individuals due in large part to unique differences in the musculature structure of the shoulder. Additionally, an exercise enthusiast that has been using an exercise routine incorporating certain shoulder exercises would inherently have at least a slightly different shoulder contour than another similarly-sized user leading a mostly sedentary lifestyle. It is therefore, variations, such as these, that cause the contour of one user's shoulder to be unique relative to the contours of other user's shoulders.

Embodiments of the present disclosure provide a solution to these unique differences in shoulder contour by providing a firearm with an associated recoil pad that is fitted according to the unique shoulder contour of each user so that recoil forces may be distributed over a relatively large portion of the user's shoulder. In some embodiments, the firearm and associated recoil pad may be at least partially fitted to the unique contour of the user's shoulder contour as will be described in detail herein below. Furthermore, embodiments of the present disclosure provide an inclusion mechanism that functions to appose disparaging against certain members of the community from otherwise participating in the clay pigeon shooting sports merely because they are disadvantaged in that they have shoulder problems stemming from a shoulder injury or shoulder surgery that inherently limits their inclusion in the enjoyment of the clay pigeon shooting sports that so many others currently enjoy.

Figure 2A:
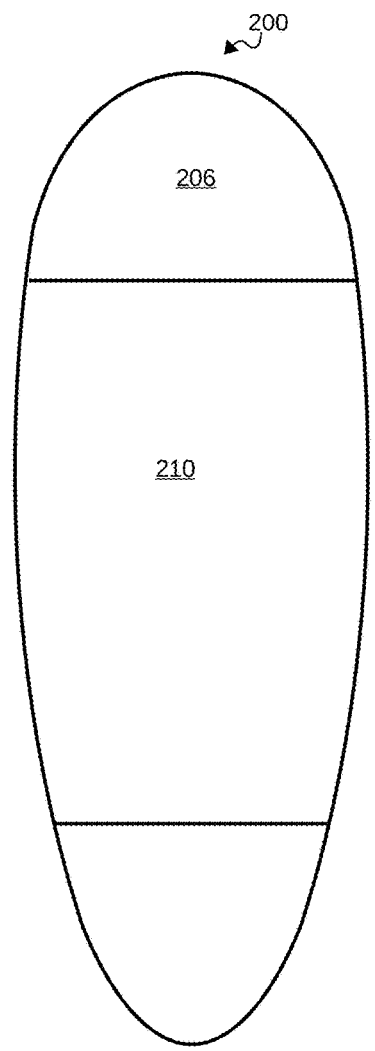
FIGS. 2A-2C illustrates an example recoil pad according to certain embodiments of the present disclosure.
Figure 2B:
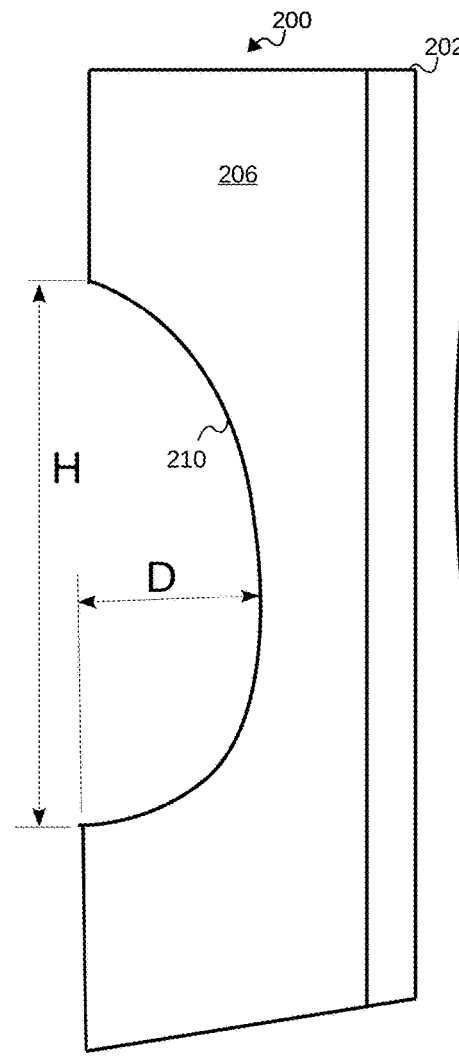
Figure 2C:
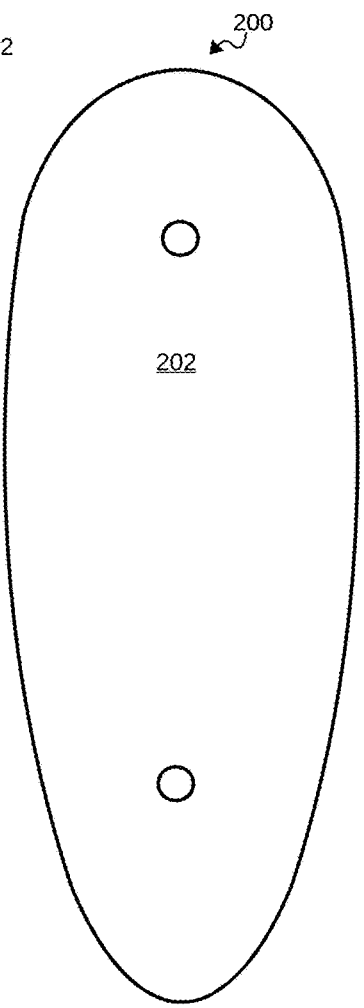

FIGS. 2A-2C illustrate one embodiment of an example recoil pad 200 according to certain embodiments of the present disclosure. In particular, FIG. 2A illustrates a front view of the recoil pad 200 showing a cavity forming a shoulder facing contour 210, while FIG. 2B illustrates a side view of the recoil pad 200 showing the shape of the shoulder facing contour 210, and FIG. 2C illustrates a rear view of the recoil pad 200 that is configured to be placed adjacent to the back end 108 of the buttstock 106. The recoil pad 200 includes a base member 202 formed of a sheet of generally rigid material, such as plastic (e.g., Acrylonitrile butadiene styrene (ABS)) having a thickness of approximately 0.25 inches or other suitable thickness. The recoil pad 200 also includes a cushion member 206 formed of an elastomeric material, such as polyurethane, that compresses or otherwise deforms under the recoil force of a shotgun. The elastomeric material may have a Shore A hardness of 45. However, in other embodiments, the elastomeric material may have a hardness of greater than Shore A 45, or less than Shore A 45.

According to certain embodiments of the present disclosure, the shoulder facing contour may have a generalized shape or contour including a height H and a depth D, that approximates the average shape of a group of users. For example, contour measurements may be obtained from multiple users (e.g., 100 users). Since each of these users may, and often do, have a unique contour (e.g., shape) of their shoulder that differs from one another, the unique contour of each user may be measured, and a curve fitting algorithm performed on all of the measured unique contours to derive the generalized shape that is configured into the cushion member 206. One example, curve fitting algorithm may include an averaging algorithm that averages the measured unique contours in order to form the generalized shoulder facing contour 210. Other types of curve fitting algorithms are well known in the art.

In one embodiment, the measured unique contours may be categorized according to one or more criteria. For example, one type of criteria may include a size of the user (e.g., small, medium, large, extra-large, etc.). Given this criterion, the measured unique contours may be formed into multiple groups in which each group is associated with a relative size of the user. For example, it may be ascertained that 15 of the 100 measured unique contours can be delineated into a small-sized group, 35 measured unique contours delineated into a medium-sized group, 35 measured unique contours delineated into a large-sized group, while 15 measured unique contours are delineated into an extra-large-sized group. Given this particular example, the curve fitting algorithm can be performed on each of these groups in order to form a small generalized contour, a medium generalized contour, a large generalized contour, and an extra-large generalized contour. Moreover, each categorized generalized contour can be implemented on corresponding recoil pads 200 so that users can select one recoil pad (e.g., small shoulder sized recoil pad, medium shoulder sized recoil pad, large shoulder sized recoil pad, extra-large shoulder sized recoil pad, etc.) that approximates their individual shoulder shape to a relatively close degree. In a particular example, a manufacturer of the recoil pads 200 may manufacture numerous recoil pads 200 in which a first quantity are implemented with the small generalized contour, while a second quantity are implemented with the medium generalized contour, a third quantity are implemented with the large generalized contour, and a fourth quantity are implemented with the extra-large generalized contour. Thus, each user may select one recoil pad 200 that most closely approximates the contour of his or her shoulder to use.

In another embodiment, the generalized contours may be obtained by Inductively estimating the shape and/or size of one or more user's shoulders. That is, the shape one or more generalized contours may be obtained according to the unique contour of only one or several individuals.

Although the criterion described above is grouped according to a size of a group of users, it should be appreciated that any suitable criterion or combination of criteria may be used. Other examples of suitable criteria may include a physique of the user (e.g., athletic build, slender build, heavyset build, etc.), age (e.g., youth, middle age, senior citizen, etc.), and the like.

Embodiments of the present disclosure having a recoil pad with a unique contour may be advantageous in that recoil force from discharge of the firearm may be optimally distributed over a relatively large surface of the user's shoulder. Additionally, providing multiple recoil pads with each having a shoulder facing contour 210 with a generalized contour that approximates a shoulder size for each user may be beneficial because customization of each recoil pad following procurement by the user may not be necessary in some cases.

In certain embodiments, either of the recoil pads 200 having a generalized shoulder facing contour 210 may be further customized to enhance its fit to each user by using a marking material, such as a pressure indicating paste. For example, following acquisition of the recoil pad 200 by a user, a layer of viscous (e.g., sticky) material, such as rosin may be applied to the shoulder facing contour 210 of the recoil pad 100, while a layer of marking material is applied to the shoulder of the user. The marking material may be any type, such as a paste, powder, or pastel-like stick filled with a coloring substance (e.g., charcoal, white powder, etc.), that is generally skin safe and is adherable to the viscous material. The user may then place the recoil pad 200 against his or her shoulder such that regions of the shoulder facing contour 210 making contact with the shoulder cause the marking material to be transferred from the shoulder of the user to those regions of the shoulder facing contour 210. The user may then remove the recoil pad 200 from the shoulder, and grind the shoulder facing contour 210 at those regions indicated by the marking material using sandpaper or other suitable grinding tool. The above described process may be repeated until the should facing contour 210 of the recoil pad 200 optimally matches that of the shoulder of the user.

Figure 3A:
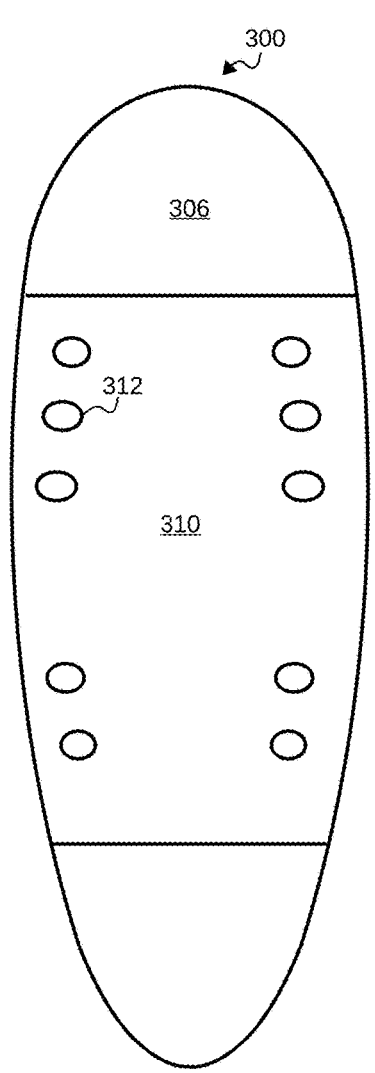
FIGS. 3A-3E, 4B-4D, and 11A-11C illustrate another recoil pad according to certain embodiments of the present disclosure.
Figure 3B:
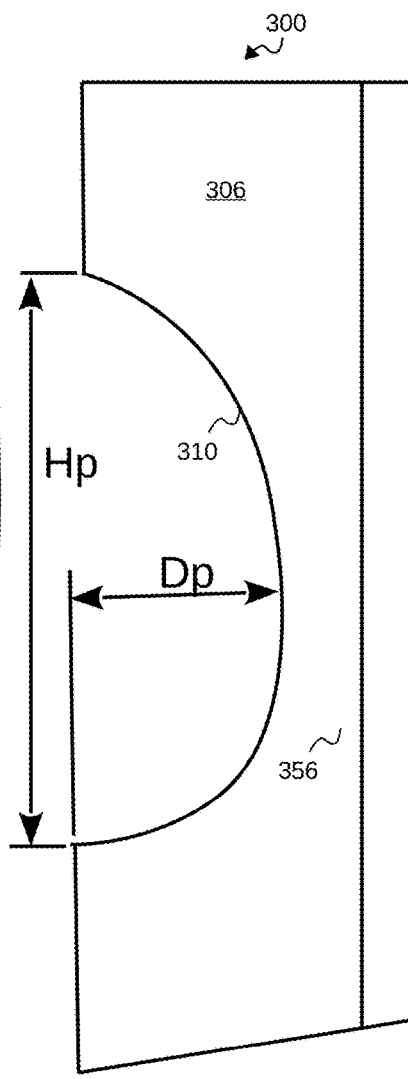
Figure 3C:
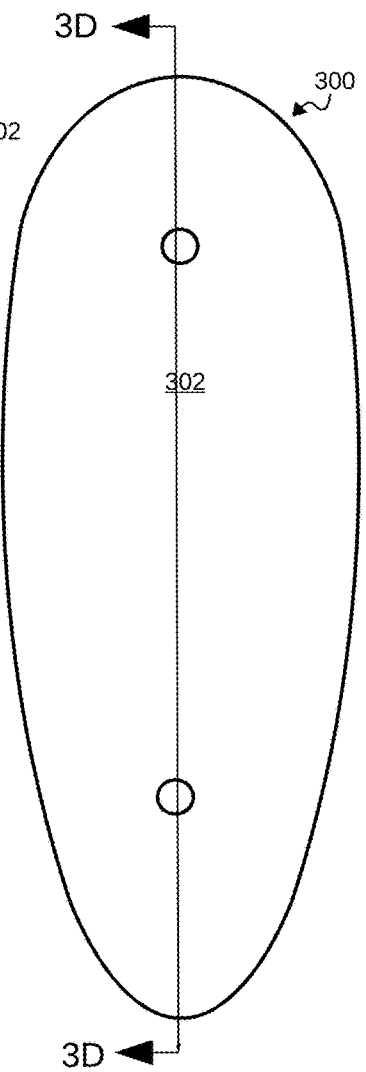
Figures 3D, 3E:
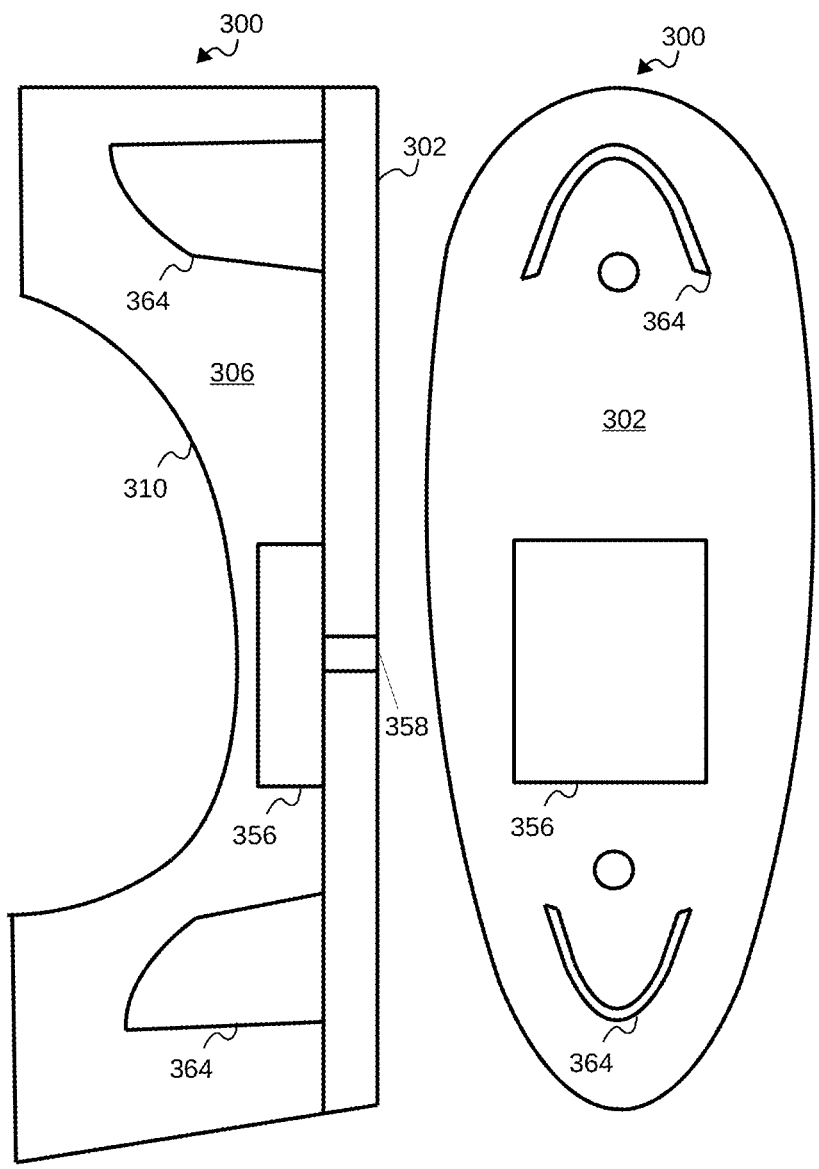

FIGS. 3A-3E, 4B-4D, and 11A-11C illustrate another recoil pad 300 according to certain embodiments of the present disclosure. In particular, FIG. 3A illustrates a front view of the recoil pad 300 showing a cavity 310, while FIG. 3B illustrates a side view of the recoil pad 300 showing the shape of the cavity 310, and FIG. 3C illustrates a rear view of the recoil pad 300. Additionally, FIG. 3D illustrates a side cut-away view of the recoil pad 300 taken along the line 3D-3D of FIG. 3C while the exposed portion of the stiffener 364 remains showing, and FIG. 3E illustrates a front view of the base member 302 prior to having the cushion member 306 molded onto the base member 302.

The recoil pad 300 has a base member 302 and a cushion member 306 that are similar in design and construction to the base member 202 and cushion member 206 of the recoil pad 200. The recoil pad 300 differs, however, in that it includes multiple inserts 308 that are each adapted for removable placement in a cavity 310 formed in the cushion member 306. Whereas the cushion member 206 is integrally formed on the base member 202 (e.g., a one piece assembly) of the recoil pad 200 of FIGS. 2A-2C, an insert 308 forming a shoulder facing contour 310 may be removed and replaced with another insert 308 having a different shoulder facing contour 310 with the recoil pad 300 of FIGS. 3A-4D. As shown, the shoulder facing contour 310 has a height Hp and a depth Dp.

Figure 11A:
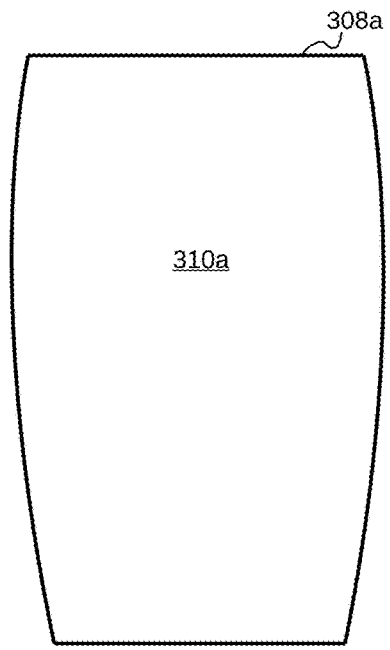
Figure 11B:
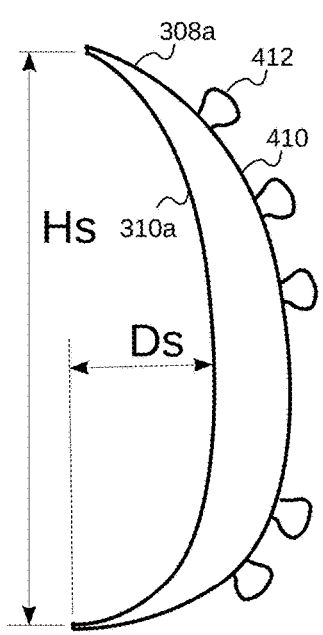
Figure 11C:
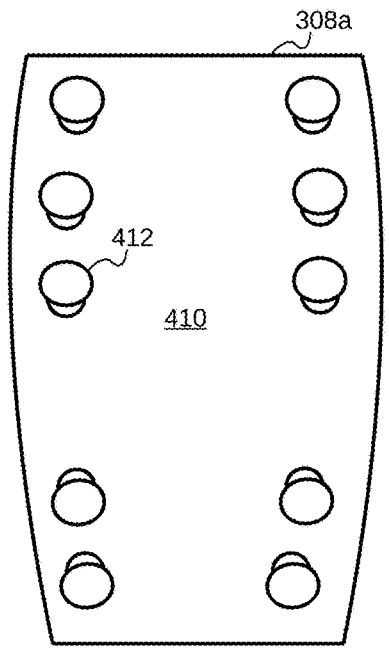
Figure 4B:
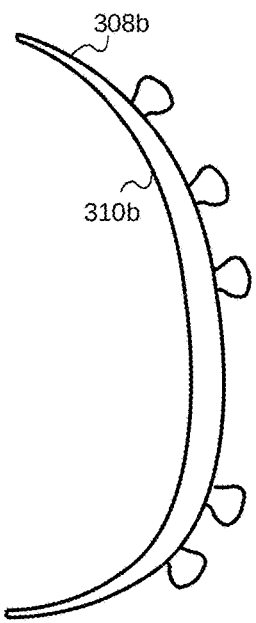
Figure 4C:
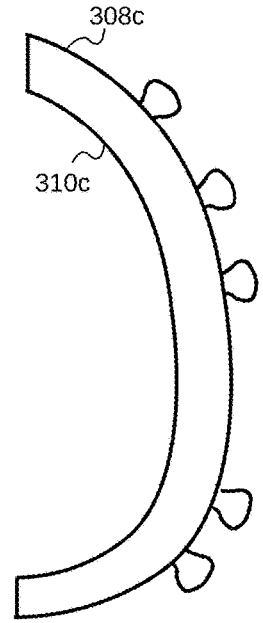
Figure 4D:
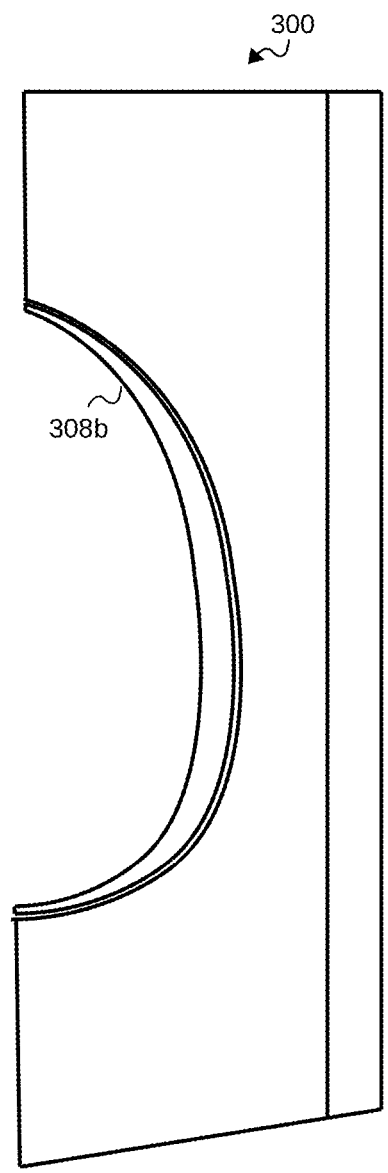

FIGS. 4B, 4C, and 11A-11C illustrate multiple example inserts 308a, 308b, and 308c that may be used with the recoil pad 300 of FIGS. 3A-3D according to certain embodiments of the present disclosure. In particular, FIGS. 11A, 11B, and 11C illustrate a first insert 308a, while FIG. 4B illustrates a second insert 308b, and FIG. 4C illustrates a third insert 308c. As shown, each of the inserts 308a, 308b, and 308c are fashioned with a pad contour 410 that is complementary to the contour of the cavity 310 of the recoil pad 300, thus enabling each of the inserts 308a, 308b, and 308c to be alternatively engaged on the recoil pad 300. FIG. 4D illustrates insert 308b releasably engaged on the recoil pad 300. Of course, insert 308b could be replaced with one of the other inserts 308a or 308c by removing the insert 308b from the recoil pad 300 and placing one of the inserts 308a or 308c in the cavity 310 of the recoil pad 300.

Each of the inserts 308a, 308b, and 308c also includes a shoulder facing contour 310a, 310b, and 310c, respectively, that differs from one another. For example, each of the shoulder facing contours 310a, 310b, and 310c may have a generalized contour that differs according to a size of the user as described above with reference to the recoil pad 200 of FIGS. 2A-2C. Nevertheless, it should be appreciated that the shoulder facing contours 310a, 310b, and 310c, may be shaped according to any suitable criteria as described above. For example, the shoulder facing contour 310a of the insert 308a may be adapted to a medium sized user, while the shoulder facing contour 310b of the insert 308b is adapted to a large sized user, and the shoulder facing contour 310c of the insert 308c is adapted to a small sized user.

FIGS. 11A, 11B, and 11C illustrate front, side, and rear views, respectively, of the insert 308a. As shown best in FIGS. 11B and 11C, multiple pegs 412 are integrally formed on the pad contour 410 that can be mated with complementary holes 312 formed in the cavity 310 of the recoil pad 300. When the insert 308a is placed against the cavity 310, the pegs 412 are forced into the holes 312 to retain the insert 308a against the cavity 310 until forceably pulled away by the user.

Certain embodiments of the recoil pad 300 assembly described above may provide certain advantages. For example, different inserts 308 may be releasably secured to the recoil pad 300 in a relatively quick and easy manner, such as when a first user, having a first individual shoulder contour desires to use a shotgun that was previously used by a second user having a second individual shoulder contour that differs from the first user. In such a case, the first user can easily replace the insert used by the second user and enjoy the benefits of reduced recoil provided by the recoil pad 300 due to the customized contour of the insert 308 that is uniquely adapted to the shoulder shape of the first user. Additionally, a single user could benefit by having multiple inserts 308 that can be alternatively used based upon the time of year (e.g., summer, spring, autumn, winter), or the type of shooting (e.g., skeet, sporting clays, trap, etc.) to be engaged in.

Referring now to FIGS. 3D and 3E, the recoil pad 300 may, in certain embodiments, include a cushion enhancing chamber 356 formed in the cushion member 306 and an access hole 358 formed in the base member 302. For example, the cushion enhancing chamber 356 and access hole 358 as shown in FIG. 3D may be seen as a cut-away view in which a portion of the cushion member 306 and base member 302 are removed in order to reveal the cushion enhancing chamber 356 and access hole 358.

The access hole 358 extends from the cushion enhancing chamber 356 to the outer surface of the base member 302 to provide fluid communication from the cushion enhancing chamber 356 to the outside environment. Moreover, the cushion enhancing chamber 356 may be entirely encompassed by the cushion member 306 and base member 302 such that the only fluid communication between the cushion enhancing chamber 356 and the outside environment is provided by the access hole 358.

Generally speaking, the cushion enhancing chamber 356 is a void (e.g., empty hole) formed in the cushion member 306 for enhancing a cushioning effect for the shoulder of the user. Although the cushion enhancing chamber 356 is shown to have a rectangular shape, it should be appreciated that the cushion enhancing chamber 356 may have any suitable shape, such as a frusto-oval shape. Additionally, Although the cushion enhancing chamber 356 is shown as being formed proximate the deepest portion of the cavity 310, it should be appreciated that the cushion enhancing member 356 may be formed at any suitable location within the cushion member 306. Also, only one cushion enhancing chamber 356 and corresponding access hole 358 is shown, it should be appreciated that any quantity of cushion enhancing chambers 356 and corresponding access holes 358 may be implemented without departing from the spirit and scope of the present disclosure.

The cushion enhancing chamber 356 may be formed inside of the cushion member 306 in any suitable manner. In one embodiment, the cushion enhancing chamber 356 may be formed by adhering a piece of removable material, such as styrofoam having dimensions of approximately 1.0 inches in height, 0.5 inches in depth, and 0.75 inches in width, onto the base member 302 such that, when the cushion member 306 is molded onto the base member 302 during manufacture, the removable material is encased between the resulting cushion member 306 and base member 302. Thereafter, a solvent, such as acetone, or methyl ethyl keystone (MEK), may be poured into the access hole 358 to dissolve the removable material thus forming the empty cushion enhancing chamber 356. The removable material may be removed at any time, such as by the manufacturer of the recoil pad 300, or by the end user. For example, the recoil pad 300 may be provided to the end user with the removable material still inside the cushion member 306 so that the end user may, at his or her discretion, remove the removable material for customizing the cushioning effect of the recoil pad 300. Moreover, if multiple cushion enhancing chambers 358 are provided, the end user may selectively remove certain ones of the removable material elements at various different locations along the cavity 310 to customize a cushioning effect for various different locations of the shoulder of the user.

In one embodiment, stiffening members 364 may be provided to stiffen the cushion member 306 proximate its top and bottom ends. As best shown in FIG. 3E, the stiffening members 364 may be formed from a sheet of material, such as ABS, and welded or otherwise attached to the base member 302. The stiffening members 364 may be attached to base member 302 prior to cushion member 306 being molded over the surface of base member 302. For example, an amorphous material, such as 2-part polyurethane, may be poured into a mold. Once poured, the assembly including base member 302, the removable material forming the cushion enhancing chamber 356, and stiffening members 364 may be placed over the still amorphous material such that it comes into direct contact with base member 302, removable material, and stiffening members 364. When the amorphous material hardens to form the cushion member 306, the stiffening members 364 serve to stiffen the cushion member 306 proximate its top and bottom ends.

Figure 5:
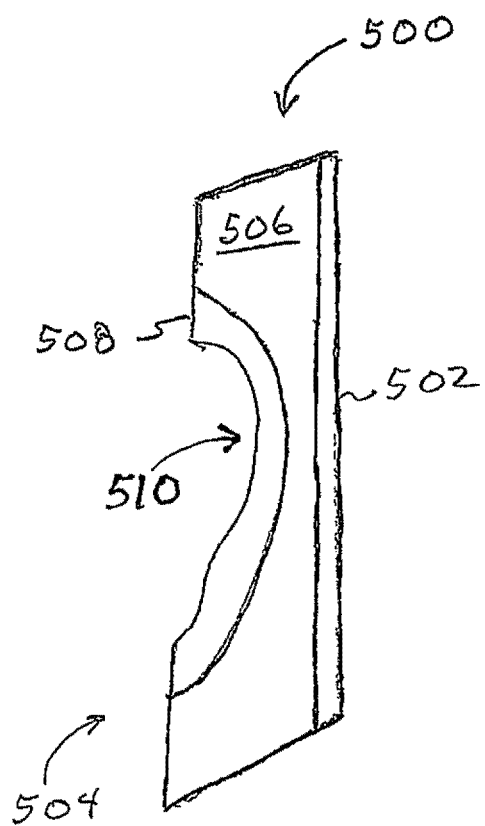
FIG. 5 illustrates another example recoil pad according to embodiments of the present disclosure.

FIG. 5 illustrates another example custom recoil pad 500 according to one embodiment of the present disclosure. The custom recoil pad 500 has a base member 502 that is similar in design and construction to the base member 202, 302 of FIGS. 2A through 3C. The custom recoil pad 500 differs, however, in that the custom recoil pad 500 includes a cushion member 504 having an pre-cured (e.g., inner) portion 506 of cured mold material and a user-cured (e.g., outer) portion 508 of cured mold material with a shoulder facing contour 510 that has been customized to match that of the shoulder of the clay pigeon shooter. Such a configuration may be useful for providing a kit to a clay pigeon shooter in which the pre-cured portion 506 has been previously cured prior to acquisition by the clay pigeon shooter, while the user-cured portion 508 may be shaped by the clay pigeon shooter so that the resulting cushion member 504 may be customized to the clay pigeon shooter's shoulder contour, while reducing the amount of mold material to be cured by the clay pigeon shooter in certain embodiments.

The pre-cured portion 506 generally refers to a portion of the cushion member 504 that is cured prior to the user-cured portion 508 being cured, while the user-cured portion 508 generally refers to that portion of the cushion member 504 that is cured by the clay pigeon shooter when shaped to match the contour of the clay pigeon shooter's shoulder. For example, the custom recoil pad 500 may be provided through a retail outlet as a kit that includes, among other things, a previously made assembly including a base member 502 and a pre-cured portion 506 that have been made (e.g., shaped and cured) by a manufacturer. The kit may also include a specified amount of amorphous hardening material, such as a two-part elastomeric polymer. Upon acquisition, the clay pigeon shooter may mix (e.g., stir, knead, etc.) and then shape the elastomeric polymer on the pre-cured portion 506 to conform to their shoulder's contour.

Certain embodiments including a pre-cured portion 506 and a user-cured portion 508 may provide certain advantages not heretofore recognized by conventional recoil pads. For example, the clay pigeon shooter may be alleviated of the complexity of forming the shape of the entire cushion member 504. Additionally, the cushion member 504 may be formed with portions having different or the same hardness. For example, the pre-cured portion 506 may be made of a material having a Shore A hardness of 40, while the user-cured portion 508 may be formed of a material having a Shore A hardness of 30. As another example, the pre-cured portion 506 and the user-cured portion 508 may both be made of a material having a Shore A hardness of 30. Other combinations of hardness levels may exist for tailoring the level and type of recoil suppression and/or durability desired by the clay pigeon shooter.

Figure 6A:
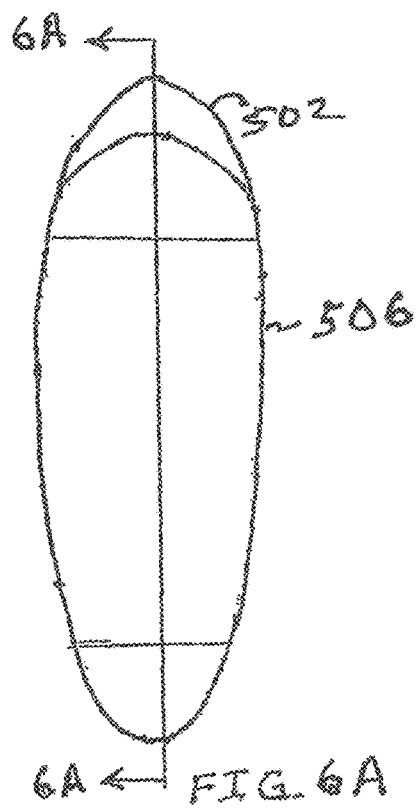
Figure 6B:
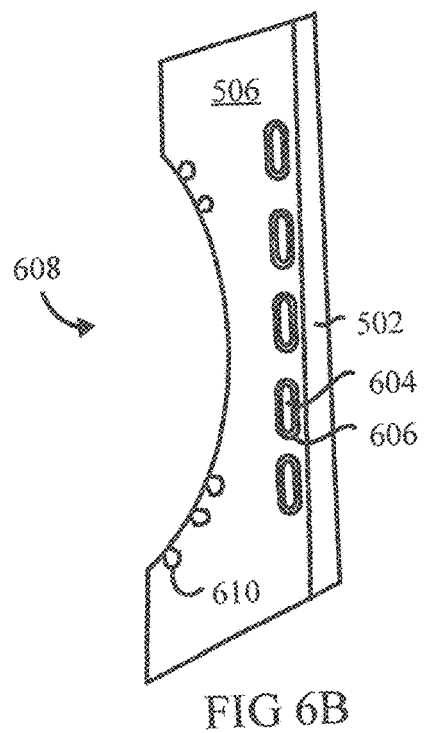

FIGS. 6A through 6F illustrate an example process that may be used to make the custom recoil pad 500 as shown in FIG. 5. In particular, FIG. 6A illustrates a rear view of the base member 502 and pre-cured portion 506 of the custom recoil pad 500, while FIG. 6B illustrates a side, cut-away view taken along the line 6A-6A of FIG. 6A of the custom recoil pad 500 according to certain embodiments of the present disclosure. The pre-cured portion 506 includes rods 604 configured in complementary holes 606, and a concave surface 608 that will be described in detail herein below.

In some embodiments, the base member 502 and pre-cured portion 506 may both be grindable (e.g., machinable) so that their outer cross-sectional shape may be grinded or otherwise machined in order to conform to the cross-sectional shape of the rear end 108 of the buttstock 106 of the shotgun 102. The cross-sectional shape of the recoil pad 500 generally refers to a shape of an outer sidewall of the recoil pad 500 that in this particular instance, is generally oval in shape. Shotguns often have buttstocks with cross-sectional shapes and sizes that differ from one another. Thus, the base member 502 and pre-cured portion 506 may be provided with a cross-sectional shape and size that can be grinded in order to conform to or otherwise be similar to the cross-sectional shape of the buttstock of the shotgun.

As shown, the pre-cured portion 506 may be provided to the clay pigeon shooter in a pre-cured form, while the user-cured portion 508 is provided in an amorphous un-cured form (e.g., shapeable, hardening putty). The pre-cured portion 506 includes a concave surface 608 that is adapted to receive the un-cured amorphous material on its surface. In one embodiment, the pre-cured portion 506 is configured with undercut recesses 610 along its concave surface 608 so that, when the amorphous material is pressed onto the concave surface 608 of the pre-cured portion 506, a portion of the un-cured material may enter the undercut recesses 610, and interlock with the pre-cured portion 506 for enhanced adhesion or binding of the user-cured portion 508 to the pre-cured portion 506 when the user-cured portion 508 has cured. As shown, the undercut recesses 610 generally include depressions whose entrance is smaller than its width. Nevertheless, it is contemplated that the concave surface 608 may be fashioned with other types of features for enhanced coupling of the pre-cured portion 506 to the user-cured portion 508 when cured. For example, it is contemplated that the concave surface 608 may be fashioned with loops (e.g., similar to the loops found on hook-and-loop fastening material) configured along the concave surface 608 that interlock with the amorphous material when pressed onto the concave surface 608. For another example, a layer of a suitable binding agent (e.g., liquid adhesive, surface etching agent, etc.) may be applied to the surface of the concave surface 608 prior to pressing the amorphous material onto its surface.

In one embodiment, the custom recoil pad 500 may be made with multiple user-cured portions 508 that can each be releasably secured onto the pre-cured portion 506 of the custom recoil pad 500. The releasable securement is provided by the undercut recesses 610 that allow the user-cured portion 508 to be pressed (e.g., snapped) onto the surface of the pre-cured portion 506 with a releasably locking fit. The user-cured portion 508 may be removed from the pre-cured portion 506 by physically pulling the user-cured portion 508 away from the pre-cured portion 506. Advantages provided by certain embodiments may include providing a recoil pad 500 with multiple user-cured portions 508 that can each be custom fitted to the clay pigeon shooter at differing times of the year (e.g., winter, summer, etc.) when body contours may change. Additionally, each of the multiple user-cured portions 508 may be custom fitted to different clay pigeon shooters so that the recoil pad 500 may be adapted for use with multiple clay pigeon shooters. Each of the multiple user-cured portions 508 may also be custom fitted to a clay pigeon shooter at ongoing intervals (e.g., every 2 years) so that the recoil pad 500 may be continually customized according to ongoing changes in that clay pigeon shooter's physique in some embodiments.

Figure 6C:
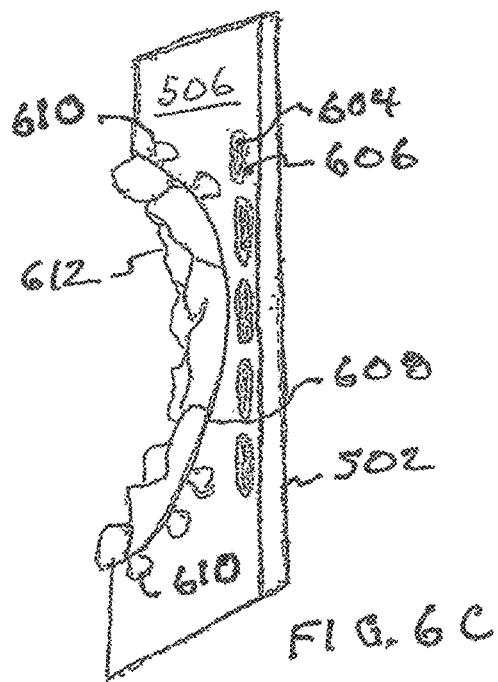

FIG. 6C illustrates a side, cut-away view taken along the line 6A-6A of FIG. 6A of the custom recoil pad 500 with a layer of amorphous material 612 placed on the concave surface 608 of the pre-cured portion 506. As shown, a portion of the amorphous material 612 has been pressed into the undercut recesses 610 so that the amorphous material 612 may interlock with the pre-cured portion 506 when the amorphous material 612 cures. The amorphous material 612 may be placed on the pre-cured portion 506 in any suitable manner. In a particular embodiment in which the amorphous material comprises two-part silicone putty, both parts of the silicone putty may be mixed (e.g., kneaded) prior to pressing the amorphous material 612 onto the pre-cured portion 506.

The amorphous material 612 may have any suitable un-cured viscosity (e.g., viscosity prior to curing) with a sufficient plasticity to generally maintain its shape once formed. In one embodiment, the amorphous material 612 may have a paste-like consistency that can be stirred using a suitable tool (e.g., mixing blade, blender, etc.), and applied to the concave surface 608 using a suitable applicator (e.g., brush, knife, etc.). In a particular example, the amorphous material 612 may be a two-part cure silicone material having a mixed viscosity of approximately 250,000 to 650,000 centipoise.

Figure 6D:
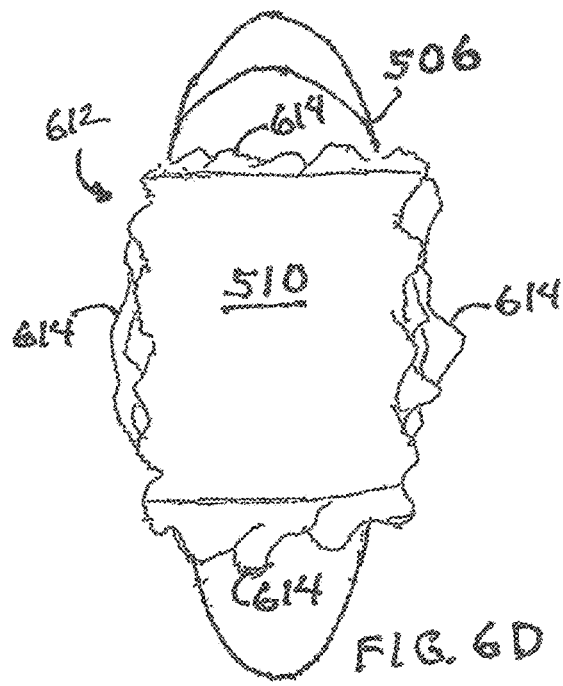

FIG. 6D illustrates a rear view of the custom recoil pad 500 with the layer of amorphous material 612 pressed onto the concave surface 608, and having a shoulder facing contour 510 formed in the amorphous material 612 according to certain embodiments of the present disclosure. In general, the shoulder facing contour 510 is formed in the amorphous material 612 as a result of pressing the custom recoil pad 500 against the shoulder 126 of the clay pigeon shooter until the shoulder facing contour 510 follows the contour of the shoulder 126. That is, the recoil pad 500 may be pressed against the shoulder of the clay pigeon shooter so that the amorphous material 612 is squeezed to form the shoulder facing contour 510 and excess amorphous material 612 is produced as buildup 614 along the edges of the shoulder facing contour 510.

In one embodiment, the base member 502, pre-cured portion 506 combination may be mounted onto the buttstock 106 of the shotgun 102 prior to the amorphous material 612 being applied to the pre-cured portion 506. Thus, the shotgun 102 and base member 502, pre-cured portion 506 combination may be mounted on the shoulder 126 of the clay pigeon shooter as is typically performed when firing the shotgun 102 for optimal fitting of the custom recoil pad 500 to the shoulder 126 of the clay pigeon shooter. In many cases, the contour of the shoulder will change based upon the relative position and orientation of the body elements, such as the torso and arm connected to the shoulder. For example, the shoulder may have a first contour when the arm is resting at the side of the torso, and a second different contour when the arm is raised due to various reasons including an extension/contraction level of the deltoidius and/or pectoralic major muscles based upon the relative position and orientation of that arm. Thus, it may be beneficial to match the shoulder facing contour 510 of the recoil pad 500, when the recoil pad 500 is mounted on the shotgun 102 and the clay pigeon shooter has mounted the shotgun 102 in a normal shooting position. For example, when the amorphous material 612 is applied to the pre-cured portion 506, the clay pigeon shooter may mount the shotgun 102 in a shooting position typically used, and physically pressing the base member 502, pre-cured portion 506 combination onto the shoulder 126 such that the amorphous material 612 is squeezed in order to form a shoulder facing contour 510 that matches the shoulder 126 of the clay pigeon shooter to a relatively close degree.

As shown, when the shoulder facing contour 510 is formed in the amorphous material 612, excess buildup 614 (e.g., overflow) of the amorphous material 612 may occur around the edges of the pre-cured portion 506 in some cases. For example, the excess buildup 614 may occur due to the pressing action of the custom recoil pad 500 against the shoulder 126 of the clay pigeon shooter in order to form the shoulder facing contour 510.

FIG. 6E illustrates a side, cut-away view taken along the line 6A-6A of FIG. 6A of the custom recoil pad 500 with the excess buildup 614 of amorphous material 612 removed in order to form the user-cured portion 508 of the custom recoil pad 500. The excess buildup 614 may be removed in any suitable manner. In one embodiment, the excess buildup 614 may be removed using a knife, such as a single-ended razor blade, that is drawn along the sides of the outer member 506 of the custom recoil pad 500.

FIG. 6F illustrates a rear view of the completed custom recoil pad 500 as shown in FIG. 6E according to certain embodiments of the present disclosure. At this point, the amorphous material 612 has cured to form the user-cured portion 508 having a shoulder facing contour 510 along its surface that matches the contour of the shoulder 126 of the clay pigeon shooter to a relatively good degree, and is ready for use in shooting the shotgun 102.

As described previously, the custom recoil pad 500 may be configured with rods 604 (see FIG. 6B) that can be selectively removed to tailor or otherwise customize the effective stiffness at various locations along the extent of the custom recoil pad 500. For example, if a particular rod 604 is removed from its associated hole 606 in the custom recoil pad 500, the effective stiffness at that location may be reduced by allowing the hole 606 to at least partially collapse under the impact forces caused by recoil of the shotgun 102. Conversely, if the rod 604 remains in the custom recoil pad 500, the hole 606 may be inhibited from at least partially collapsing due to the presence of the rod 604, thus maintaining the effective stiffness at that location.

In some embodiments, the rods 604 may be selectively removed from certain holes 606 in order to adjust the effective stiffness at various locations along the custom recoil pad 500. For example, a clay pigeon shooter having recently undergone shoulder surgery may be experiencing a sharp, painful sensation at the top of their shoulder. In such a case, the rods 604 proximate the top of the custom recoil pad 500 may be removed so that the top portion of the custom recoil pad 500 is effectively softened, while the brunt of impact recoil force is borne by the lower portion of the custom recoil pad 500. In some cases, when the painful sensations cease, the rods 604 may be re-inserted into their respective holes 606 as needed. Similar scenarios may be performed to reduce and/or increase the effective stiffness at other regions (e.g., middle, bottom, etc.) of the custom recoil pad 500.

As shown, the rods 604 have a generally oval cross-sectional shape, and are arranged in a single row between the base member 502 and the user-cured portion 508. Nevertheless, it is contemplated that the rods 604 may have any suitable shape (e.g., rectangular, triangular, circular, etc.), and be arranged in any quantity of rows, such as two, three, or four or more rows. Additionally, it is contemplated that the rods 604 may be arranged in any suitable pattern (e.g., random spacing and orientation, alternating triangular pattern, etc.) without departing from the spirit and scope of the present disclosure.

Any suitable type of mold material may be used for generating the pre-cured portion 506, user-cured portion 508, or cushion member 206, 306, 506 as shown and described. For a particular example, the pre-cured portion 506 may be made of two-part polyurethane elastomeric polymer (e.g., mold rubber) material having a liquid consistency prior to curing, and an elastomeric hardness of Shore A 50 when cured. For another particular example, the user-cured portion 508 may be made from a two-part silicone polymer material having a putty-like, shapeable consistency prior to curing, and an elastomeric hardness of Shore A 40 when cured. In some cases, a two-part silicone polymer material may be beneficial due to its relatively low toxicity level to human skin. Other examples of suitable types may include one part cure silicone, two-part cure polymer foam, one part cure polymer open cell foam, two part cure closed cell foam, viscoelastic urethane, polystyrene, a shape memory polymer (SMP), or any combination thereof. In some cases, the shape memory polymer material may be useful for making (e.g., shaping) the user-cured portion 508 in a manner that can be repeatedly shaped as the shoulder contour of the clay pigeon shooter changes over time.

Additionally, the base member 202, 302, 502 may be made from any suitable material, such as polyethylene, acrylonitrile butadiene styrene (ABS), aluminum, steel, or other suitable material. In a particular example, the base member 202, 302, 502 may be formed from an aluminum alloy plate having a thickness of approximately 0.1875 inches. In another particular example, the base member 202, 302, 502 may comprise a first plate and a second plate formed of a machinable (e.g., grindable) material, such as plastic. The first plate being coupled to the pre-cured portion 506 or cushion member 206, 306, 506 and having a standard mounting hole pattern. The second plate has a first set of holes with the standard mounting hole spacing to accommodate mounting to the first plate using screws, and a region whereby a second set of holes may be drilled by the clay pigeon shooter to accommodate a unique hole spacing of the buttstock 106 of the shotgun 102. Such an arrangement may be useful for cases where the base member 502 may be used to mount to buttstocks having different mounting hole patterns relative to one another.

Although FIGS. 6A through 6F illustrate one or more particular embodiments of how to make the custom recoil pad 500, it should be appreciated that the custom recoil pad 500 may be made using fewer, different, or additional steps than what is described herein. For example, mixing (e.g., kneading) of the amorphous material 612 may not be necessary if a 1-part material is used. As another example, the excess buildup 614 may be removed at any time after the shoulder facing contour 510 is formed in the amorphous material 612, such as before the amorphous material 612 has cured. As yet another example, the rods 604 and/or their associated holes 606 may be omitted from the custom recoil pad 500 if not needed or desired. As yet another example, although the cushion member 504 of FIG. 5 is shown and described with two layers, it should be appreciated that the cushion member 504 may include greater than two layers, such as three or more layers.

Figure 7A:
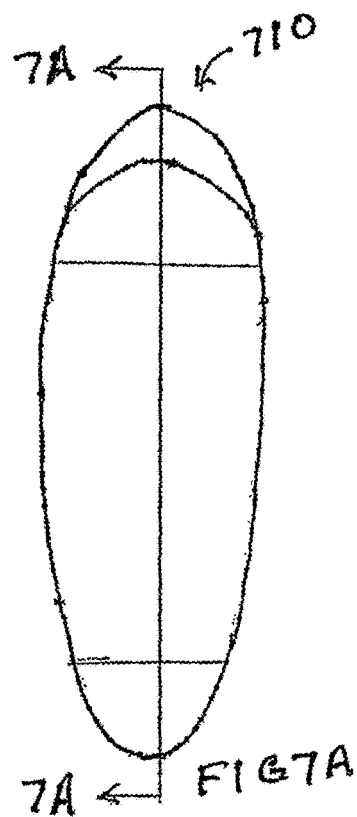
FIGS. 7A through 7H illustrate an example custom recoil pad and an associated process that may be performed to make the custom recoil pad according to certain embodiments of the present disclosure.
Figure 7B:
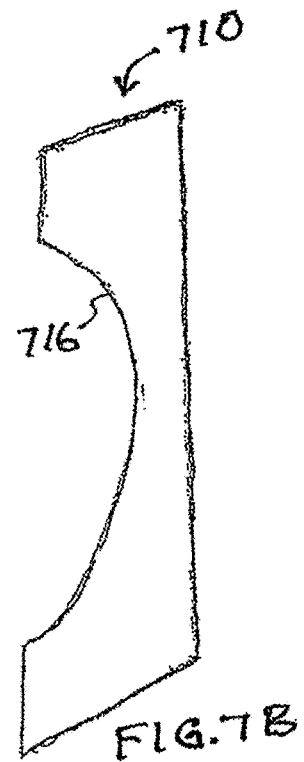
Figure 7C:
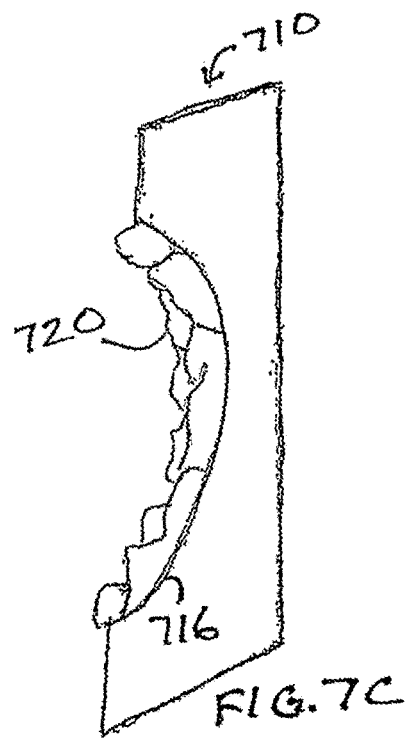
Figure 7D:
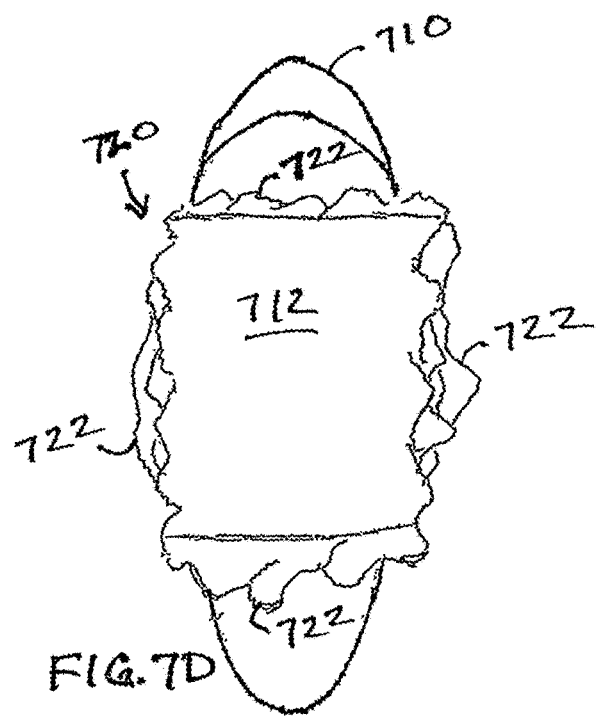
Figure 7E:
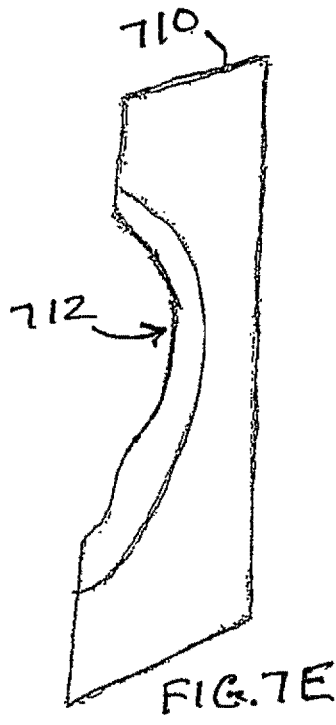
Figure 7G:
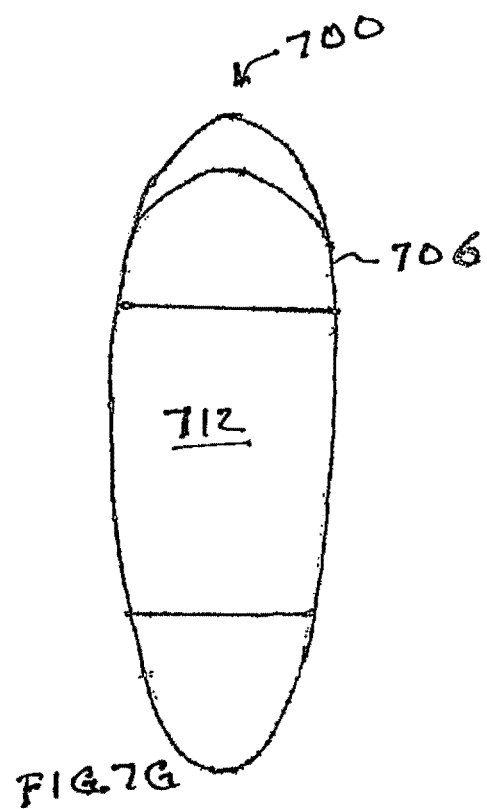
Figure 7F:
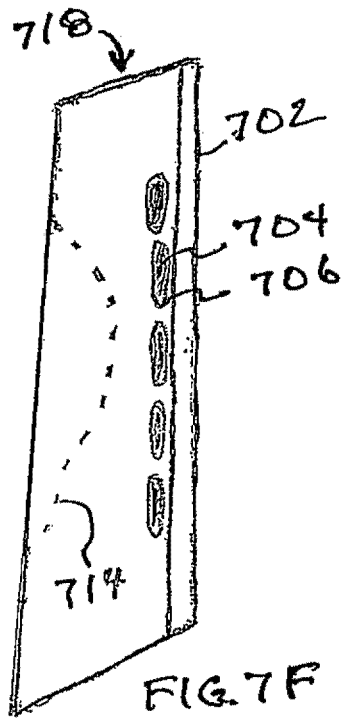
Figure 7H:
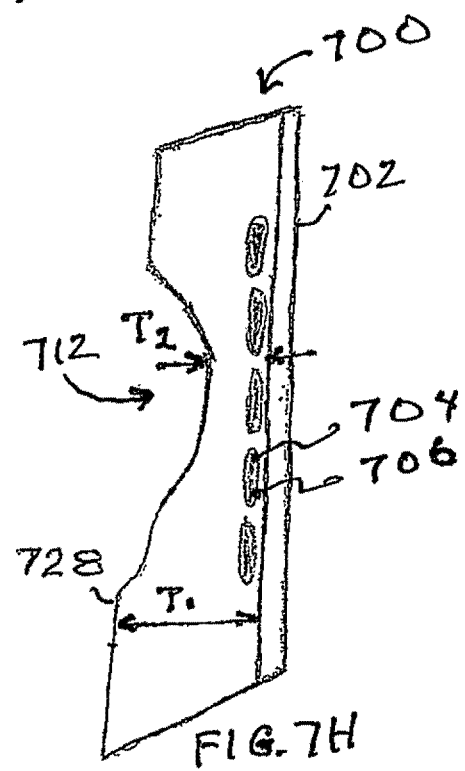

FIGS. 7A through 7H illustrate an example custom recoil pad 700 and an associated process that may be performed to make the custom recoil pad 700 according to certain embodiments of the present disclosure. In particular, FIGS. 7G and 7H illustrate a rear view and a side view, respectively, of the custom recoil pad 700, while FIGS. 7A through 7F illustrate how various elements may be used to make the custom recoil pad 700. The custom recoil pad 700 has a base member 702 and rods 704 configured in holes 706 that are similar in design and construction to the base member 502, rods 604, and holes 606 of the custom recoil pad 500. The custom recoil pad 700 differs, however, in that it has a cushion member 728 formed from a single piece of soft material (e.g., silicone, closed cell foam, polyurethane, Sorbothane™, etc.) that can be cut using a suitable tool, such as a scroll saw, a coping saw, and the like, to form a shoulder facing contour 712 that matches the contour of the clay pigeon shooter's shoulder 126. In some embodiments, the base member 702 and cushion member 728 may both be grindable (e.g., machinable) so that the outer perimeter may be grinded or otherwise machined in order to conform to the cross-sectional shape of the buttstock 106 of the shotgun 102.

FIG. 7A illustrates a rear view of a contour gauge 710, while FIG. 7B illustrates a side, cut-away view taken along the line 7A-7A of FIG. 7A of the contour gauge 710 according to certain embodiments of the present disclosure. In general, the contour gauge 710 is used to generate a contour marking line 714 (see FIG. 7F) representing a shoulder contour of the clay pigeon shooter. Once generated, the contour marking line 714 may be transferred to a blank recoil pad 718 (see FIG. 7F), and the blank recoil pad 718 cut along the contour marking line 714 in order to form the custom recoil pad 700. Referring again to FIGS. 7A and 7B, the contour gauge 710 includes a concave surface 716 and is formed from a generally rigid material that can be temporarily mounted onto the buttstock 106 of the shotgun 102.

In this disclosure, the term 'blank recoil pad' generally refers to a type of recoil pad on which no custom shoulder facing contour has yet been imparted. In one embodiment, the blank recoil pad 718 (See FIG. 7F) may have grindable sidewalls so that it may be machined or otherwise grinded to have a cross-sectional shape similar to the cross-sectional shape of the buttstock of the shotgun.

FIG. 7C illustrates a side, cut-away view taken along the line 7A-7A of FIG. 7A of the contour gauge 710 with a layer of non-hardening amorphous material 720 (e.g., modeling clay, etc.) pressed onto the concave surface 716 of the contour gauge 710. The concave surface 716 may have a texture and consistency such that the non-hardening amorphous material 720 sticks or otherwise temporarily adheres to the concave surface 716.

FIG. 7D illustrates a rear view of the contour gauge 710 with the layer of non-hardening amorphous material 720 pressed onto the concave surface 716, and having a shoulder facing contour 712 formed in the non-hardening amorphous material 720 according to certain embodiments of the present disclosure. In general, the shoulder facing contour 712 is formed in the non-hardening amorphous material 720 as a result of pressing the contour gauge 710 against the shoulder 126 of the clay pigeon shooter until the shoulder facing contour 712 follows the contour of the shoulder 126.

The contour gauge 710 may be mounted onto the buttstock 106 of the shotgun 102 prior to the non-hardening amorphous material 720 being applied to the concave surface 716. Thus, the shotgun 102 and contour gauge 710 may be mounted on the shoulder 126 of the clay pigeon shooter as is typically performed when firing the shotgun 102 for generating a contour marking line 714 that optimally matches the shoulder 126 of the clay pigeon shooter. For example, when the non-hardening amorphous material 720 is applied to the concave surface 716, the clay pigeon shooter may mount the shotgun 102 by physically pressing the contour gauge 710 onto the shoulder 126 such that the non-hardening amorphous material 720 is squeezed in order to form the shoulder facing contour 712 that matches the shoulder 126 of the clay pigeon shooter to a relatively close degree. As shown, when the shoulder facing contour 712 is formed in the non-hardening amorphous material 720, excess buildup 722 (e.g., overflow) of the non-hardening amorphous material 720 may occur around the edges of the contour gauge 710 in some cases. For example, the excess buildup 722 may occur due to the pressing action of the contour gauge 710 against the shoulder 126 of the clay pigeon shooter in order to form the shoulder facing contour 712.

FIG. 7E illustrates a side, cut-away view taken along the line 7A-7A of FIG. 7A of the contour gauge 710 with the excess buildup 722 of non-hardening amorphous material 720 removed. The excess buildup 722 may be removed in any suitable manner. In one embodiment, the excess buildup 722 may be removed using a knife, such as a single-ended razor blade, that is drawn along the sides of the contour gauge 710.

FIG. 7F illustrates a rear view of the blank recoil pad 718 having a contour marking line 714 configured on its side surface according to certain embodiments of the present disclosure. The contour marking line 714 may be created from the shoulder facing contour 712 generated by the contour gauge 710. The contour marking line 714 may be transferred in any suitable manner. In one embodiment, the contour marking line 714 may be created by aligning the contour gauge 710 directly on top of the blank recoil pad 718 and tracing the contour marking line 714 on the side surface of the blank recoil pad 718 using a suitable writing utensil, such as a pen, or pencil. In another embodiment, the contour marking line 714 may be created by tracing the shoulder facing contour 712 onto a suitable marking medium (e.g., paper, tape, etc.), and subsequently transferring the shoulder facing contour 712 onto the blank recoil pad 718 by wrapping the marking medium around a side of the blank recoil pad 718, and tracing the shoulder facing contour 712 onto the blank recoil pad 718.

Once the contour marking line 714 has been created, the blank recoil pad 718 may be cut along the contour marking line 714 to form the custom recoil pad 700 having a shoulder facing contour 712 that matches a shoulder contour of the clay pigeon shooter. In one embodiment, the shoulder facing contour 712 may be iteratively tailored to more closely match the contour of the user's shoulder. For example, a relatively thin sheet of pressure marking strip having layer of wax-like coloring agent disposed thereon may be temporarily configured on the shoulder facing contour 712 such that, when the shotgun 102 configured with the custom recoil pad 700 is mounted in the shooting position on the shoulder of the clay pigeon shooter, the wax-like coloring may be transferred to the shoulder facing contour 712 at locations where relatively high levels of pressure (e.g., contact) exist. The shotgun 102 may then be un-mounted and the shoulder facing contour 712 ground down at those locations such that the resulting shoulder facing contour 712 more closely matches the contour of the shoulder. The above described process may be repeated to iteratively refine the shoulder facing contour 712 to match that of the user's shoulder.

The cushion member 728 may have any un-cut thickness $T_1$ that provides sufficient cushioning at the narrowest portion $T_2$ of the shoulder facing contour 712, while encompassing a sufficient region of the shoulder's contour. Given the myriad of differing shoulder contours and sizes of many clay pigeon shooters, it has been determined that the cushion member 728 having an un-cut thickness $T_1$ of at least approximately 1.58" inches may provide relatively good cushioning at the narrowest portion $T_2$ of the shoulder facing contour, while providing a relatively good extent over the contour of the shoulder's contour of most clay pigeon shooters.

Although the recoil pad 700 as shown and described above is shaped (e.g., formed) by cutting (e.g., machining) the shoulder facing contour 712 in a blank recoil pad 718, it is contemplated that a custom recoil pad may be made by forming a negative mold around the contour gauge 710 to create a negative impression of the contour gauge 710 with the shoulder facing contour 712, and pouring a hardening material into the negative impression to form a cushion portion of the recoil pad. For example, the negative mold may be formed around a portion (e.g., the sidewall and shoulder facing contour 712) of the contour gauge 710 using a suitable material (e.g., gypsum plaster) that is poured around the contour gauge 710 and allowed to cure. After the negative mold has cured, an uncured mixture of hardening material (e.g., platinum cure silicone with a cured shore A hardness of 40) may be poured into the negative mold to form the cushion portion of the recoil pad. In one embodiment, a base member may be configured with undercut holes or recesses having any suitable shape and size that function as undercuts so that when the uncured hardening material is introduced (e.g., poured) into the negative mold, the base member may be placed against the negative mold such that a portion of the mold material may be pushed into the holes or recesses for securing the cushion member to the base member.

Although FIGS. 7A through 7H illustrate one or more particular embodiments of how to make the custom recoil pad 700, it should be appreciated that the custom recoil pad may be made using fewer, different, or additional steps than what is described herein. For example, a contour gauge (e.g., profile gauge) having multiple pins or slats that are set tightly against one another in a frame which keeps them in the same plane and parallel while allowing them to move independently, perpendicularly to the frame may be used in in place of the contour gauge 710 as described above if measuring the contour of the shoulder when the shotgun 102 is mounted is not needed or desired. As another example, the rods 704 and/or their associated holes 706 may be omitted from the custom recoil pad 700 if not needed or desired.

Figure 8B:
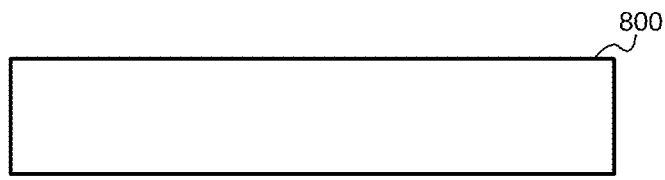
FIGS. 8A-8C illustrate an example spacer that may be used with the recoil pad according to certain embodiments of the present disclosure.
Figure 8A:
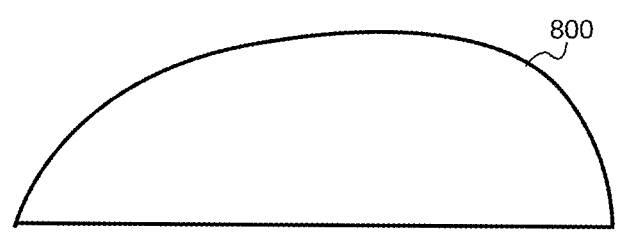
Figure 8C:
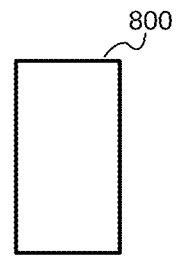

FIGS. 8A-8C illustrate an example spacer 800 that may be used with the recoil pad 200, 300, 500, 700 according to certain embodiments of the present disclosure. In particular, FIG. 8A illustrates a side view of the spacer 800, while FIGS. 8B and 8C illustrate a front view and top view, respectively, of the spacer 800.

Figure 9:
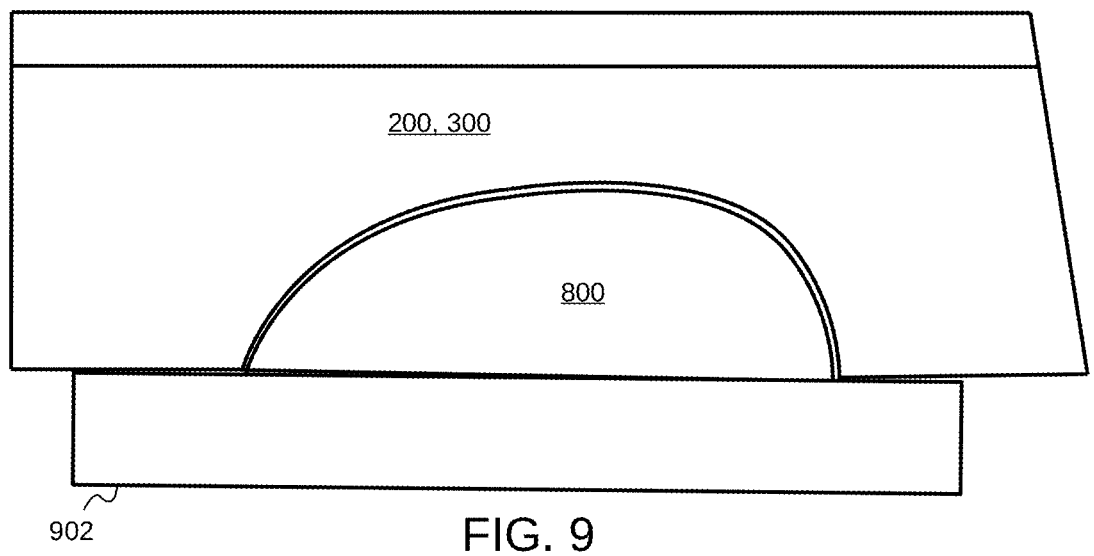
FIG. 9 illustrates an example of how the spacer may be used with the recoil pad according to certain embodiments of the present disclosure.

FIG. 9 illustrates an example of how the spacer 800 may be used with the recoil pad 200, 300, 500, 700 according to certain embodiments of the present disclosure. In particular, FIG. 9 illustrates a portion of a grinding jig 902 on which the recoil pad 200, 300, 500, 700 is releasably mounted for grinding of the recoil pad 200, 300, 500, 700, such as to size the outer contour of the recoil pad 200, 300, 500, 700 to conform to the contour of the butt of the shotgun. The spacer 800 provides support for the region of the cushion member proximate the cavity so that the recoil pad 200, 300, 500, 700 may be grinded to a relative precise degree. The spacer 800 may be made of any suitable material, such as wood, metal, plastic, or the like, and has a generally rigid consistency to support the recoil pad 200, 300, 500, 700 when mounted on the grinding jig 902.

FIGS. 10A through 10C illustrate an example elastomeric drill bit 1000 according to one embodiment of the present disclosure. In particular, FIGS. 10A and 10B illustrates a side view and front view, respectively, of the bit 1000. FIG. 10C illustrate a cross-sectional side view of the bit 1000 taken along the lines 10C-10C of FIG. 10A.

The bit 1000 generally includes an elongated hollow tube 1002 having a first end formed with teeth 1004 and the second end filled with a generally rigid material 1006, such as metal. The tube may be made of any material, such as steel, or brass. In use, the second end is inserted into a drill chuck. When the drill is on (e.g., drill chuck is turning), the teeth 1004 cut through any elastomeric material for fashioning a hole in the elastomeric material.

The clay pigeon shooting system 100 as described above may be used to, among other things, enhance the enjoyment and entertainment of the clay shooting sports. Nevertheless, it is contemplated that the clay pigeon shooting system 100 can be used for guns in other shooting sports, such as hunting. Additionally, although a particular type of gun commonly referred to as a shotgun is described and shown herein, it is contemplated that embodiments of the present disclosure may be used with any suitable type of firearm for, among other things, reducing the detrimental effects of recoil on the shoulder of any user.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A recoil pad making method comprising:
   providing a base member attached to a first portion of a cushion member, the base member configured to be mounted to a buttstock of a gun, wherein the first portion is pre-cured on the base member;
   shaping an amorphous hardening material on a first surface of the first portion to form a second portion of the cushion member; and
   shaping, prior to hardening of the amorphous hardening material, the amorphous hardening material around a portion of a shoulder of a user to create a second surface of the second portion that has a shoulder facing contour that matches a contour of the portion of the shoulder.

2. The recoil pad making method of claim 1, further comprising shaping the amorphous material comprising a hardening material having a shapeable plasticity before being hardened and an elastic consistency after hardening to at least partially deform in response to a recoil force of the gun.

3. The recoil pad making method of claim 1, further comprising removing the second portion from the first portion of the cushion member, and removably engaging another second portion on the first portion of the cushion member.

4. The recoil pad making method of claim 1, further comprising shaping the amorphous material by pressing the recoil pad against the shoulder of the user prior to hardening of the amorphous hardening material.

5. The recoil pad making method of claim 1, further comprising shaping, prior to hardening of the amorphous hardening material, the amorphous hardening material in one or more undercut recesses configured in the first portion to form one or more pegs that releasably secure the second portion to the first portion when the amorphous hardening material is cured.

6. The recoil pad making method of claim 1, further comprising:
   forming a cushion enhancing chamber in the first portion, the cushion enhancing chamber comprising a piece of removable material that is encased between the first portion and the base member; and
   removing the cushion enhancing member using a solvent.

7. The recoil pad making method of claim 1, further comprising providing one or more stiffening members that are attached to the base member and embedded in the first portion of the cushion member.

8. The recoil pad making method of claim 1, wherein the amorphous hardening material comprises a two-part silicone polymer.

9. A recoil pad making method comprising:
   creating a base member that is configured to be mounted to a buttstock of a gun;
   attaching a first portion of a cushion member to the base member; and
   shaping an amorphous hardening material on a first surface of the first portion to form a second portion of the cushion member; and
   shaping, prior to hardening of the amorphous hardening material, the amorphous hardening material around a portion of a shoulder of a user to create a second surface of the second portion that has a shoulder facing contour that matches a contour of the portion of the shoulder.

10. The recoil pad making method of claim 9, further comprising shaping the amorphous material comprising a hardening material having a shapeable plasticity before being hardened and an elastic consistency after hardening to at least partially deform in response to a recoil force of the gun.

11. The recoil pad making method of claim 9, further comprising shaping, prior to hardening of the amorphous hardening material, the amorphous hardening material in one or more undercut recesses configured in the first portion to form one or more pegs that releasably secure the second portion to the first portion when the amorphous hardening material is cured.

12. The recoil pad making method of claim 9, further comprising shaping the amorphous material by pressing the recoil pad against the shoulder of the user prior to hardening of the amorphous hardening material.

13. The recoil pad making method of claim 9, further comprising:

attaching one or more stiffening members to the base member; and embedding the stiffening members in the first portion of the cushion member.

14. A recoil pad making method comprising:

creating a base member that is configured to be mounted to a buttstock of a gun;

attaching a first portion of a cushion member to the base member; and providing an amorphous hardening material, the amorphous hardening material configured to be shaped on a first surface of the first portion to form a second portion of the cushion member, wherein prior to hardening of the amorphous hardening material, the amorphous hardening material is configured to be shaped around a portion of a shoulder of a user to create a second surface of the second portion that has a shoulder facing contour that matches a contour of the portion of the shoulder.

15. The recoil pad making method of claim 14, wherein the amorphous material comprises a hardening material that has a shapeable plasticity before being hardened and an elastic consistency after hardening to at least partially deform in response to a recoil force of the gun.

16. The recoil pad making method of claim 14, wherein the second portion is configured to be removed from the first portion of the cushion member, and removably engaged on another second portion on the first portion of the cushion member.

17. The recoil pad making method of claim 14, wherein the amorphous material is configured to be shaped by pressing the recoil pad against the shoulder of the user prior to hardening of the amorphous hardening material.

18. The recoil pad making method of claim 14, further comprising forming one or more undercut recesses in the first portion.

19. The recoil pad making method of claim 14, further comprising:

forming a cushion enhancing chamber in the first portion, the cushion enhancing chamber comprising a piece of removable material that is encased between the first portion and the base member; and removing the cushion enhancing member using a solvent.

20. The recoil pad making method of claim 14, further comprising:

attaching one or more stiffening members to the base member; and embedding the stiffening members in the first portion of the cushion member.

* * * * *